United States Patent
Zhang et al.

(10) Patent No.: US 11,782,999 B2
(45) Date of Patent: Oct. 10, 2023

(54) METHOD FOR TRAINING FUSION ORDERING MODEL, SEARCH ORDERING METHOD, ELECTRONIC DEVICE AND STORAGE MEDIUM

(71) Applicant: Beijing Baidu Netcom Science and Technology Co., Ltd., Beijing (CN)

(72) Inventors: Liang Zhang, Beijing (CN); Xiangjian Zeng, Beijing (CN); Cihang Jin, Beijing (CN); Tiannan Fu, Beijing (CN); Ruina Yin, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 142 days.

(21) Appl. No.: 17/397,189

(22) Filed: Aug. 9, 2021

(65) Prior Publication Data

US 2021/0365517 A1    Nov. 25, 2021

(30) Foreign Application Priority Data

Dec. 18, 2020  (CN) .......................... 202011506705.2

(51) Int. Cl.
  G06F 16/00    (2019.01)
  G06F 16/9538  (2019.01)
  (Continued)

(52) U.S. Cl.
  CPC ........ G06F 16/9538 (2019.01); G06F 16/957 (2019.01); G06N 20/00 (2019.01)

(58) Field of Classification Search
  CPC ............... G06F 16/9538; G06F 16/957; G06F 16/3322; G06F 16/953; G06F 7/08;
  (Continued)

(56) References Cited

U.S. PATENT DOCUMENTS

2004/0267774 A1*  12/2004  Lin ................... G06F 16/5838
2007/0043583 A1*  2/2007   Davulcu ............. G06F 16/951
                                                705/347
(Continued)

FOREIGN PATENT DOCUMENTS

CN    105224959    1/2016
CN    105701216    6/2016
(Continued)

OTHER PUBLICATIONS

Notice of Reasons for Refusal JP 2021-121052 dated Aug. 8, 2022 (8 pages).
(Continued)

*Primary Examiner* — Jared M Bibbee
(74) *Attorney, Agent, or Firm* — Hamre, Schumann, Mueller & Larson, P.C.

(57) ABSTRACT

A method for training a fusion ordering model, a search ordering method, an electronic device and a storage medium, and related to the technical field of artificial intelligence such as deep learning and the like are provided. The method includes: inputting prediction scores of a plurality of targets included in a candidate search result into a fusion ordering model, to obtain a fusion ordering result; collecting feedback information of the plurality of targets included in the fusion ordering result; and updating the fusion ordering model by utilizing the feedback information and a combined function, wherein the combined function is a function constructed by utilizing the plurality of targets. The solution of the embodiment is favorable for balancing the requirements of the plurality of targets, and the obtained updated fusion ordering model can provide a better search ordering result.

18 Claims, 4 Drawing Sheets

(51) Int. Cl.
*G06F 16/957* (2019.01)
*G06N 20/00* (2019.01)

(58) Field of Classification Search
CPC .... G06F 16/24578; G06N 20/00; G06N 3/04; G06N 3/08; G06N 3/045; G06Q 30/0254; G06Q 30/0282; G06Q 30/0631
See application file for complete search history.

(56) References Cited

U.S. PATENT DOCUMENTS

| | | | | |
|---|---|---|---|---|
| 2007/0156621 | A1* | 7/2007 | Wright | G06Q 30/02 706/48 |
| 2007/0255755 | A1* | 11/2007 | Zhang | G06F 16/78 |
| 2009/0006216 | A1* | 1/2009 | Blumenthal | G06Q 30/0643 705/26.62 |
| 2011/0125572 | A1* | 5/2011 | Cantu-Paz | G06Q 30/0244 705/14.46 |
| 2011/0270672 | A1 | 11/2011 | Dustin et al. | |
| 2012/0197711 | A1 | 8/2012 | Zhou et al. | |
| 2018/0025407 | A1* | 1/2018 | Zhang | G06Q 10/02 705/26.81 |
| 2019/0197180 | A1* | 6/2019 | Jersin | H04L 51/214 |
| 2019/0205477 | A1 | 7/2019 | Huang | |

FOREIGN PATENT DOCUMENTS

| | | |
|---|---|---|
| CN | 109377445 | 2/2019 |
| CN | 110569427 | 12/2019 |
| CN | 111309939 | 6/2020 |
| JP | 2009-522665 | 6/2009 |

OTHER PUBLICATIONS

Extended European Search Report EP 21188868.0 (dated Feb. 24, 2022) (10 pages).
First Office Action, issued in the corresponding European patent application No. 21188868.0, dated Feb. 14, 2023, 10 pages.

* cited by examiner

METHOD FOR TRAINING FUSION ORDERING MODEL, SEARCH ORDERING METHOD, ELECTRONIC DEVICE AND STORAGE MEDIUM

CROSS-REFERENCE TO RELATED APPLICATION

This application claims priority to Chinese patent application No. 202011506705.2, filed on Dec. 18, 2020, which is hereby incorporated by reference in its entirety.

TECHNICAL FIELD

The present disclosure relates to the technical field of computers, and in particular to the technical field of artificial intelligence such as deep learning and the like.

BACKGROUND

In a search engine, a user searches a webpage library by inputting or by means of searching a suggested prompt entry, acquires a result matched with a search word, and returns the result to the user after ordering. In addition to information requirements explicitly expressed by search terms, the user often has some relevant information requirements at the same time. Therefore, in many popular search engine products, there are some recommending functions to meet the user's relevant information needs. Through the search suggestion and the search recommendation, the requirement of the user in a search engine can be guided and stimulated, and the search efficiency is improved.

SUMMARY

The present disclosure provides a method for training a fusion ordering model, a search ordering method, an apparatus and a device.

According to one aspect of the present disclosure, a method for training a fusion ordering model is provided, including:

inputting prediction scores of a plurality of targets included in a candidate search result into an initial fusion ordering model, to obtain a fusion ordering result;

collecting feedback information of the plurality of targets included in the fusion ordering result; and updating the initial fusion ordering model by utilizing the feedback information and a combined function, to obtain an updated fusion ordering model, wherein the combined function is a function constructed by utilizing the plurality of targets.

According to another aspect of the present disclosure, a search ordering method is provided, including:

inputting prediction scores of a plurality of targets included in a candidate search result into an updated fusion ordering model, to obtain an updated fusion ordering result;

wherein the updated fusion ordering model is trained using the method for training a fusion ordering model in any one of the embodiments of the present disclosure.

According to another aspect of the present disclosure, an apparatus for training a fusion ordering model is provided, including:

a fusion ordering module configured for inputting prediction scores of a plurality of targets included in a candidate search result into an initial fusion ordering model, to obtain a fusion ordering result;

a feedback collection module configured for collecting feedback information of the plurality of targets included in the fusion ordering result; and an updating module configured for updating the initial fusion ordering model by utilizing the feedback information and a combined function, to obtain an updated fusion ordering model, wherein the combined function is a function constructed by utilizing the plurality of targets.

According to another aspect of the present disclosure, a search ordering apparatus is provided, including:

a fusion ordering module configured for inputting prediction scores of a plurality of targets included in a candidate search result into an updated fusion ordering model, to obtain an updated fusion ordering result;

wherein the updated fusion ordering model is trained using the method for training a fusion ordering model in any one of the embodiments of the present disclosure.

According to another aspect of the present disclosure, there is provided a computer program product including computer instructions which, when executed by a processor, cause the processor to perform the method in any one of the embodiments of the present disclosure.

It should be understood that the content described in this section is neither intended to limit the key or important features of the embodiments of the present disclosure, nor intended to limit the scope of the present disclosure. Other features of the present disclosure will be readily understood through the following description.

BRIEF DESCRIPTION OF THE DRAWINGS

The drawings are used to better understand the scheme and do not constitute a limitation to the present disclosure. In which.

DETAILED DESCRIPTION

Exemplary embodiments of the present disclosure are described below in combination with the drawings, including various details of the embodiments of the present disclosure to facilitate understanding, which should be considered as exemplary only. Thus, those of ordinary skill in the art should realize that various changes and modifications can be made to the embodiments described here without departing from the scope and spirit of the present disclosure. Likewise, descriptions of well-known functions and structures are omitted in the following description for clarity and conciseness.

Figure 1:
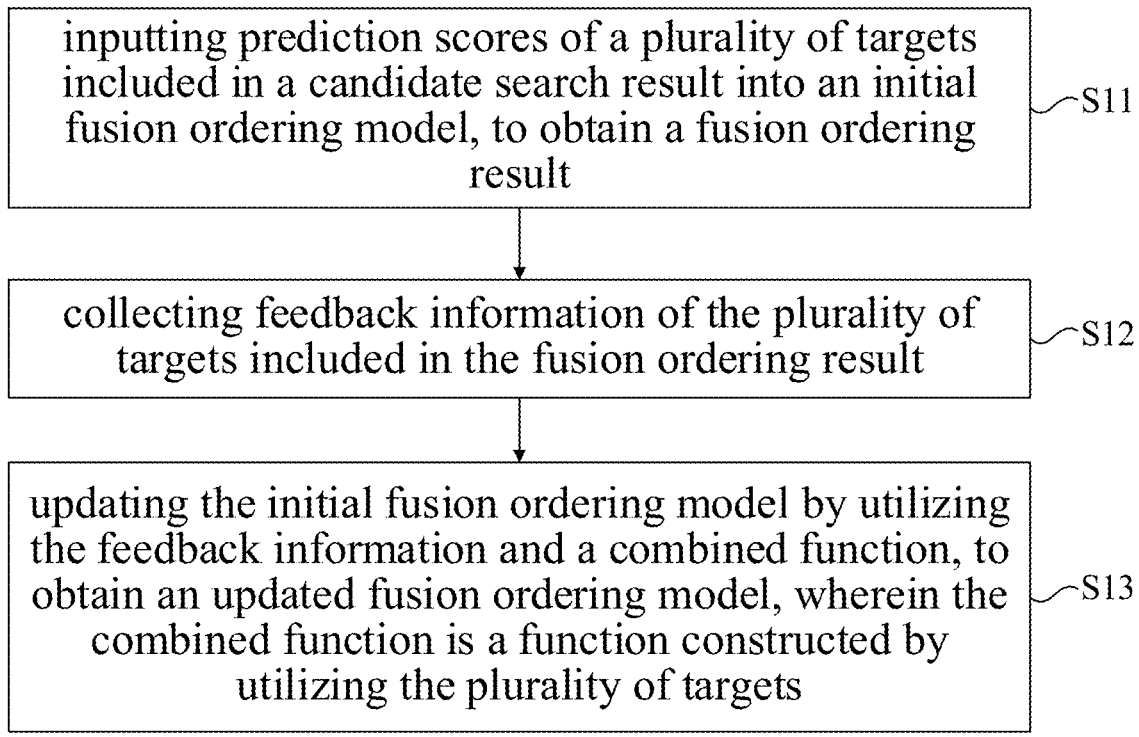
FIG. 1 is a flow diagram of a method for training a fusion ordering model according to an embodiment of the present disclosure.

FIG. 1 is a flow diagram of a method for training a fusion ordering model according to an embodiment of the present disclosure. The method may include:

S11, inputting prediction scores of a plurality of targets included in a candidate search result into an initial fusion ordering model, to obtain a fusion ordering result;

S12, collecting feedback information of the plurality of targets included in the fusion ordering result; and S13, updating the initial fusion ordering model by utilizing the feedback information and a combined function, to obtain an updated fusion ordering model, wherein the combined function is a function constructed by utilizing the plurality of targets.

According to the technology provided by the present disclosure, the requirements of a plurality of targets are favorably balanced, and the obtained updated fusion ordering model can provide better search ordering results.

Illustratively, there may be a plurality of candidate search results. The plurality of candidate search results may be obtained based on a certain keyword. These candidate search results may include prediction scores of a plurality of targets.

For example, if three webpage links are searched based on a certain keyword, and prediction scores of a plurality of targets included in each webpage link can be obtained. The plurality of targets are CTR and CPM, respectively. The prediction score of CTR of a webpage A is A1, and the prediction score of CPM of the webpage A is A2. The prediction score of CTR of a webpage B is B1, and the prediction score of CPM of the webpage B is B2. The prediction score of CTR of a webpage C is C1, and the prediction score of CPM of the webpage C is C2.

After the prediction scores of the plurality of targets included in each candidate search result are input into an initial fusion ordering model, a secondary ordering may be performed on respective candidate search results through the initial fusion ordering model, to obtain an initial fusion ordering result. For example, if the original ordering is the webpage A, the webpage B, and the webpage C. The score of the webpage A obtained after fusion ordering through the fusion ordering model is smaller than that of the webpage B, and the ordered fusion ordering result is adjusted to be the webpage B, the webpage A and the webpage C.

Based on the fusion ordering result, several users can carry out feedback operations such as clicking on respective search results included in the fusion ordering result. Statistical data corresponding to the plurality of targets included in each search result, i.e., feedback information, may be collected respectively, for example, actual CTR and CPM of the webpage B, actual CTR and CPM of the webpage A, and actual CTR and CPM of the webpage C.

The parameters of the fusion ordering model can be adaptively updated based on the collected feedback information and a preset combined function. The combined function may be constructed based on a plurality of targets. For example, the combined function may be constructed based on CTR and CPM. Prediction scores of the plurality of targets may be calculated based on the combined function. On this basis, an algorithm for updating model parameters, such as an evolution algorithm and the like, is used for iteration, the parameters of the fusion ordering model are updated, and finally the fusion ordering model is close to multi-target optimization. The ordering of search results which more conform to multi-target requirements may be obtained by using the updated fusion ordering model. The ordering based on the search results may display search suggestions, search recommendations and the like which more conform to the multi-target requirements, in a search engine. For example, search suggestions, search recommendations and the like with higher click rates and lower costs may be displayed in the search engine.

The solution of the embodiment of the present disclosure is favorable for balancing the requirements of a plurality of targets, and the obtained updated fusion ordering model can provide better search ordering results.

Another embodiment of the present disclosure provides a method for training a fusion ordering model, which may include respective operations of the embodiment shown in FIG. 1. In this embodiment, the prediction scores of the plurality of targets included in the candidate search result may be obtained using prediction models of the plurality of targets.

Illustratively, each target may have a corresponding prediction model. For example, CTR has a corresponding CTR prediction model, click traffic has a corresponding click traffic prediction model, CPM has a corresponding CPM prediction model, and total income has a corresponding total income prediction model.

Illustratively, recalled data and/or characteristic data of each candidate search result can be respectively input into prediction models of a plurality of targets, to obtain prediction scores of the plurality of targets included in each candidate search result. By utilizing prediction models of the plurality of targets, a prediction score meeting the characteristics of each target can be conveniently obtained. Then, S11, S12 and S13 are executed.

In addition, the process of updating the initial fusion ordering model by using the feedback information and the combined function may be an iterative updating process. The fusion ordering model updated each time can be used as an initial fusion ordering model of the next time, feedback information and the combined function are continuously utilized for updating, to realize dynamic updating of the fusion ordering model.

In order to acquire feedback information for the fusion ordering result, the fusion ordering result can be displayed in the search engine in the form of search recommendation, search suggestion and the like. The user may be interested in some search results in the displayed fusion ordering result and thus carry out an operation such as clicking. Actual statistical data corresponding to each target included in each search result may be collected as feedback information. For example, click rate, click amount, total income, CPM and the like for each displayed recommendation item are collected separately. The search suggestion and/or the search recommendation including the fusion ordering result can be intuitively displayed through a search engine, and the feedback information of the user for the fusion ordering result can also be acquired.

In one implementation, the plurality of targets includes a first class of targets related to traffic and a second class of targets related to income. The first class of targets are related to traffic, and the second class of targets are related to income, facilitating the balance of user requirements and result values, providing search ordering results according to the user requirements and improving income.

In one implementation, the first class of targets include: at least one of the click traffic and click rate; and the second class of targets include: at least one of cost per mille (CPM) and total income.

For example, the click traffic may be the number of times a candidate search result, a recommended item in a displayed search recommendation, or a suggested item in a search suggestion is clicked.

For example, the click rate may also be referred to as click-through-rate (CTR). In an application scenario, the click rate may be the click-through-rate of the web advertisement, i.e., the actual click traffic of the advertisement. In the embodiments of the present disclosure, the click rate may be a ratio of the number of times a candidate search result, a recommended item in a search recommendation, or a suggested item in a search suggestion is clicked to the number of times displayed.

For example, cost per mille (CPM) is a basic form of measuring advertising effectiveness. CPM may be the cost of displaying an advertisement to one thousand people each time. In the embodiments of the present disclosure, the click rate may be the cost of displaying a candidate search result, a recommended item in a search recommendation, or a suggested item in a search suggestion to one thousand people.

For example, the total income may be a total income for candidate search results, recommended terms in search recommendations, or suggested terms in search suggestions, etc.

The click traffic and click rate are related to traffic, the CPM and total income are related to income, facilitating the balance of user requirements and result values, providing search ordering results meeting user requirements and improving income.

In one implementation, the fusion ordering model includes at least one of:

Example 1: a linear model used for carrying out a linear addition on the prediction scores of the first class of targets and the second class of targets, and calculating a fusion ordering score.

For example, the prediction score of CTR and the prediction score of CPM are linearly added, to calculate a fusion ordering score.

As another example, the prediction score of the click traffic and the prediction score of the total income are linearly added, to calculate a fusion ordering score.

As another example, the prediction score of the CTR, the prediction score of the click traffic and the prediction score of the total income are linearly added, to calculate a fusion ordering score.

As another example, the prediction score of the CTR, the prediction score of the click traffic, the prediction score of the CPM and the prediction score of the total income are linearly added, to calculate a fusion ordering score.

Example II: a deep model used for discretizing or expanding the prediction scores of the first class of targets and the second class of targets, and calculating a fusion ordering score through a multilayer neural network.

For example, the prediction scores of CTR and CPM are discretized or expanded, and a fusion ordering score is calculated by a multi-layer neural network.

As another example, the prediction score of the click traffic and the prediction score of the total income are discretized or expanded, and a fusion ordering score is calculated through a multilayer neural network.

As another example, the prediction score of the CTR, the prediction score of the click traffic and the prediction score of the total income are discretized or expanded, and a fusion ordering score is calculated through a multilayer neural network.

As another example, the prediction score of the CTR, the prediction score of the click traffic, the prediction score of the CPM and the prediction score of the total income are discretized or expanded, and a fusion ordering score is calculated through a multilayer neural network.

Example III: a fitting model used for combining the prediction scores of the first class of targets and the second class of targets in an exponent and/or logarithmic form, to calculate a fusion ordering score. The fitting function may not be limited to a specific structure, and is specifically adjusted according to an actual disclosure scenario.

For example, the prediction score of CTR is combined with the prediction score of CPM in an exponent form, to calculate a fusion ordering score.

As another example, the prediction score of the click traffic is combined with the prediction score of the total income in a logarithmic form, to calculate a fusion ordering score.

As another example, the prediction score of the CTR, the prediction score of the CPM, the prediction score of the click traffic and the prediction score of the total income are combined in exponent and logarithmic forms, to calculate a fusion ordering score.

The first class of targets related to traffic and the second class of targets related to income are utilized to construct a fusion ordering model, so that search ordering results obtained by the fusion ordering model can meet user requirements and improve income.

In one implementation, the combined function includes at least one of:

Example 1: a traffic and income exchange ratio function, wherein the traffic and income exchange ratio function is constructed based on a traffic loss ratio and an income raising ratio.

The following are several examples of the traffic and income exchange ratio function.

For example: evaluation score=click traffic loss ratio/CPM raising ratio.

As another example: evaluation score=click traffic loss ratio/total income raising ratio.

As another example: evaluation score=CTR loss ratio/CPM raising ratio.

As another example: evaluation score=CTR loss ratio/total income raising ratio.

Example II: an exponent fusion function, wherein the exponent fusion function is constructed based on the traffic loss ratio and the income raising ratio.

The following are several examples of the exponent fusion function.

For example: evaluation score=exp(click traffic loss ratio)−exp(CPM raising ratio)

As another example: evaluation score=exp(click traffic loss ratio)−exp(total income raising ratio).

As another example: evaluation score=exp(CTR loss ratio)−exp(CPM raising ratio).

As another example: evaluation score=exp(CTR loss ratio)−exp(total income raising ratio).

Example III: a unilateral suppression fusion function, wherein the unilateral suppression fusion function is constructed based on a traffic gain and an income gain.

For example, baseline data and experimental data may be obtained based on collected feedback information. A traffic gain and an income gain are constructed by using the baseline data and the experimental data, and a unilateral inhibition fusion function is constructed by using the traffic gain and the income gain.

A combined function is constructed by using a first class of targets related to traffic and a second class of targets related to income, and the combined function is used for evaluating and updating the fusion ordering model, so that the updated fusion ordering model can approach to the global optimum of balance of traffic and income, and the obtained search ordering result can meet the requirements of users and raise the income.

Figure 2:
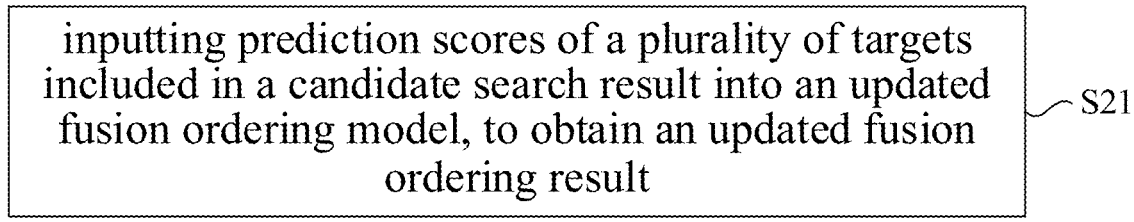
FIG. 2 is a flow diagram of a search ordering method according to an embodiment of the present disclosure.

FIG. 2 is a flow diagram of a search ordering method according to an embodiment of the present disclosure. The method may include:

S21, inputting prediction scores of a plurality of targets included in a candidate search result into an updated fusion ordering model, to obtain an updated fusion ordering result.

The updated fusion ordering model may be trained using the method for training a fusion ordering model in any one of the above embodiments.

Illustratively, the plurality of candidate search results may be obtained based on a certain keyword. These candidate search results may include prediction scores of a plurality of targets. For a specific example, reference may be made to relevant descriptions in the embodiment of the method for training a fusion ordering model, which will not be described in detail herein. The candidate search results used in the process of training the fusion ordering model may be the same as or different from the candidate search results used in the search ordering process. Candidate search results used in different scenarios may also be different. For example, candidate search results obtained using different keywords may be different.

After the prediction scores of a plurality of targets included in each candidate search result are input into an updated fusion ordering model, a secondary ordering may be performed on respective candidate search results through the updated fusion ordering model, to obtain an updated fusion ordering result.

In the embodiment, the updated fusion ordering model can realize multi-target balance, and the obtained search ordering result is better. For example, the updated fusion ordering model trained based on the goals of traffic and income approaches to the global optimum of balance of traffic and income, and the obtained search ordering result can meet the requirements of users and raise income.

Figure 3:
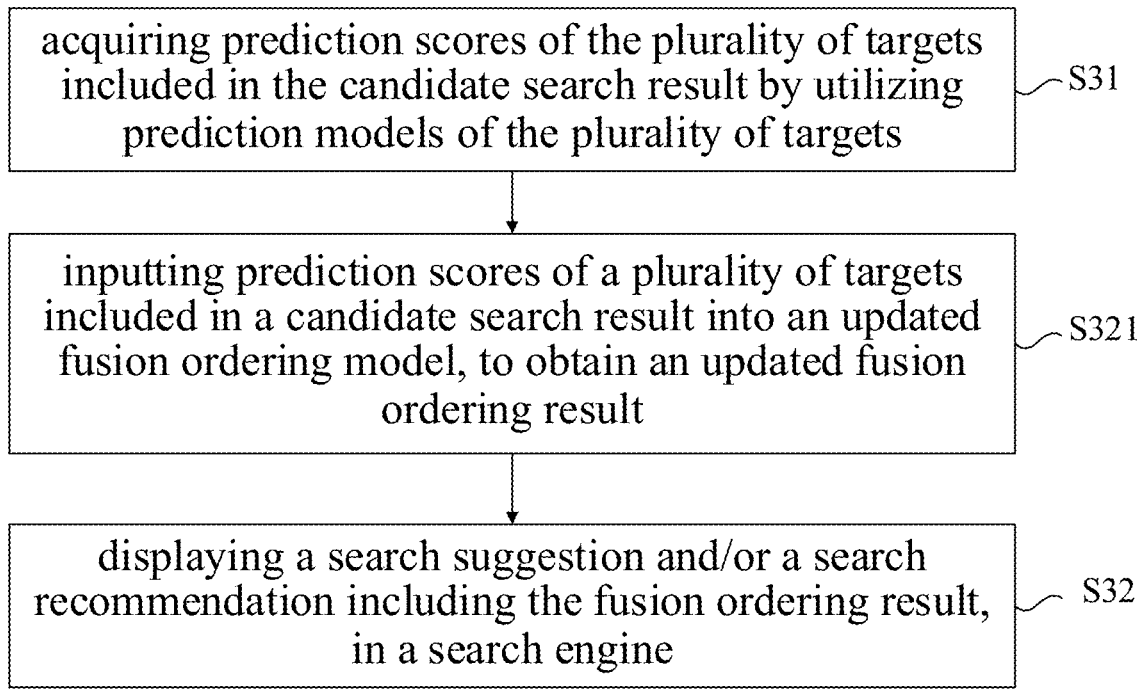
FIG. 3 is a flow diagram of a search ordering method according to another embodiment of the present disclosure.

FIG. 3 is a flow diagram of a search ordering method according to another embodiment of the present disclosure. The search ordering method of this embodiment may include respective operations of embodiments of the search ordering method described above. In this embodiment, the method may further include:

S31, acquiring prediction scores of the plurality of targets included in the candidate search result by utilizing prediction models of the plurality of targets.

Illustratively, each target may have a corresponding prediction model. For example, CTR has a corresponding CTR prediction model, click traffic has a corresponding click traffic prediction model, CPM has a corresponding CPM prediction model, and total income has a corresponding total income prediction model.

Illustratively, recalled data and/or characteristic data of each candidate search result can be respectively input into prediction models of a plurality of targets, to obtain prediction scores of the plurality of targets included in each candidate search result. By utilizing prediction models of the plurality of targets, a prediction score meeting the characteristics of each target can be conveniently obtained. Then, S321 is executed, the prediction scores of a plurality of targets included in each candidate search result are input into an updated fusion ordering model, to obtain an updated fusion ordering result. S321 shown in FIG. 3 is an operation same as or similar to S21 shown in FIG. 2.

In one implementation, the method further includes:

S32, displaying a search suggestion and/or a search recommendation including the fusion ordering result, in a search engine.

Illustratively, the fusion ordering result can be displayed in the search engine in the form of search recommendation, search suggestion and the like. The user may be interested in some search results in the displayed fusion ordering result and thus carry out an operation such as clicking. Actual statistical data corresponding to each target included in each search result may be collected as feedback information. For example, click rate, click amount, total income, CPM and the like for each displayed recommendation item are collected separately. The search suggestion and/or the search recommendation including the fusion ordering result can be intuitively displayed through a search engine, and the feedback information of the user for the fusion ordering result can also be acquired. The feedback information for the fusion ordering result obtained in the search ordering process may also be used in the training process, the fusion ordering model is continuously trained, to realize the dynamic updating of the fusion ordering model.

The search ordering method provided by the embodiment of the present disclosure is a novel search suggestion and recommendation ordering algorithm in a search engine, so that related requirements of a user and the cashability are balanced, and the monetization efficiency is further improved while the better product experience is provided.

Figure 4:
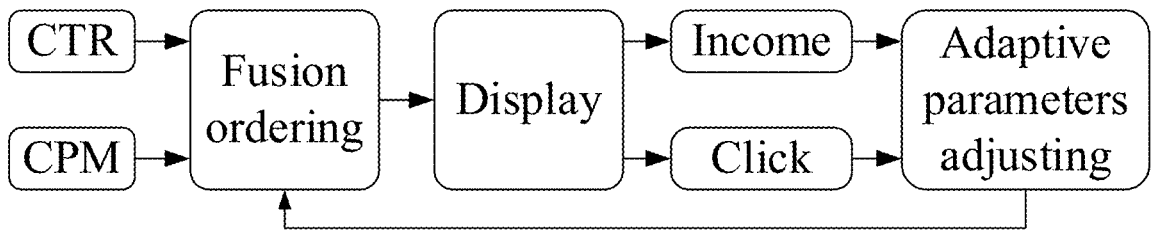
FIG. 4 is a schematic diagram of an example of a search ordering framework of an embodiment of the present disclosure.

FIG. 4 shows an example of a search ordering framework of an embodiment of the present disclosure. The overall flow may include: an underlying module separately calculates a score for a plurality of targets to be fused, the targets include but are not limited to prediction values such as CTR, CPM, or quality scores. The fusion ordering module carries out fusion on respective scores of the plurality of targets, to calculate a final ordering score. In the fusion process, the final score may be calculated using pre-calculated model initial parameters. The respective online actual effects of the parameters are obtained by collecting the actual statistical values of the respective targets. Then, an adaptive parameter adjusting module updates iteration parameters based on respective target actual effects. The ordering result approaches to the global optimal solution for the plurality of targets through continuous parameter iterations.

Illustratively, the above flow may be implemented by several modules as follows:

1. A Multi-Target Score Calculation Module:

The multi-target score calculation module may acquire recalled and characteristic data according to respective target requirements in a business scenario. Herein, the content of the recalled data may include prefix-query combinations of search suggestions, search recommendation results, etc. For example, "Mr./Miss Liu" is recalled for prefix "Liu" by generating a prefix based on user behavior or query. The content of the recalled data may also include recalling relevant recommendations after a query. For example, after searching "Mr./Miss Liu", a recommendation term "Mr./Miss Zhang" is recalled. Feature data may include features such as click traffic of search suggestion, click traffic of recommendations, the number of query search co-occurrences, text embedding and the like. Herein, the examples of search co-occurrences may include search query of word B after search query of word A, and A and B may constitute a co-occurrence.

Respective scores of a plurality of targets are obtained through methods such as models, rules and the like. Taking the two targets of click and income as an example, after all recalled data and feature data are acquired for each of the plurality of target, in the aspect of click target, each candidate click rate is calculated according to a click through rate (CTR) prediction model, such as deep neural networks (DNN) and extreme gradient boosting (XGBoost) models; and in the aspect of income target, respective CPMs are predicted through statistical history CPMs or according to characteristics such as user characteristics, behavior statistics and the like. After the respective scores are calculated, the scores may be ordered by a downstream fusion ordering module.

2. A Fusion Ordering Module

The main function of the fusion ordering module is to fuse multi-target results and perform secondary ordering on search results, so that the final ordering result is optimal for the multi-target. The score calculated by the bottom model of each target may be used in the fusion ordering module, the final ordering score is obtained through the fusion ordering model, and the final ordering result is displayed based on the final ordering score. Illustratively, the fusion ordering model may include a linear model, a deep model, or a fitting model that does not define a particular structure, etc. For example, the linear model may be used to carry out a linear addition on click rate scores and income scores. As another example, the deep model may be used to discretize or expand click rates and income scores, and calculate scores through a multilevel neural network. As another example, the fitting model that does not define a particular structure may combine the plurality of targets in an exponent and/or logarithmic form, to calculate a score.

3. A Multi-Target Feedback Collection Module

After fusion ordering, the results are displayed in the form of recommendation, search suggestion and other products. The user may then be interested in some displayed search results and thus carry out an operation such as clicking. Through the multi-target feedback collection module, actual statistical data corresponding to each target may be collected. For example, core indexes corresponding to each target are collected, such as recommendation item click rate, total income, CPM, etc.

4. An Adaptive Parameter Updating Module

In the parameter updating module, statistics of a plurality of targets may be combined through an optimal combination solution designed in advance, to calculate a unique evaluation score. For example, the ways of calculation may include, but is not limited to, at least one of the following:

(1) Traffic and income exchange ratio. The way may construct an evaluation function based on the loss ratio of the target related to the traffic and the raising ratio of the target related to the income.

For example: evaluation score=click traffic loss ratio/ CPM raising ratio.

As another example: evaluation score=click traffic loss ratio/total income raising ratio.

As another example: evaluation score=CTR loss ratio/ CPM raising ratio.

As another example: evaluation score=CTR loss ratio/ total income raising ratio.

(2) Exponent fusion. The way may construct an evaluation function based on the loss ratio of the target related to the traffic and the raising ratio of the target related to the income.

For example: evaluation score=exp(click traffic loss ratio)−exp(CPM raising ratio)

As another example: evaluation score=exp(click traffic loss ratio)−exp(total income raising ratio).

As another example: evaluation score=exp(CTR loss ratio)−exp(CPM raising ratio).

As another example: evaluation score=exp(CTR loss ratio)−exp(total income raising ratio).

Herein, exp( ) may represent an exponential function with a natural constant e as a base.

(3) Unilateral suppression fusion. The way may construct an evaluation function based on an experimental data sample of the target related to the traffic and baseline data of the target related to the income.

For example:

$$reward_{charge} = \left(\exp\left(\left(\frac{CPM_{expr}}{CPM_{base}} - 1\right) \times a\right)\right)^{-1}$$

$$\Delta CTR = \left(\frac{CTR_{base}}{CTR_{expr}}\right)^n - 1$$

$$reward = \begin{cases} reward_{charge}, \Delta CTR \leq 0; \\ reward_{charge} + \Delta CTR, \Delta CTR > 0 \circ \end{cases}$$

Here, an income gain may be represented by $reward_{charge}$, and a click gain may be represented by $\Delta CTR$. $CPM_{expr}$ may represent experimental data for CPM, and $CPM_{base}$ may represent baseline data for CPM. The parameter a and the parameter n may be manually setting empirical values, for adjusting the value condition of converting a multi-target statistical value (income gain, click gain) into a final single-dimension reward (evaluation index). The value of the parameter a can be adjusted, for example the initial value of a can be equal to 100. The value of the parameter n can also be adjusted. Baseline data for CTR may be presented by $CTR_{base}$, and experimental data for CTR may be presented by $CTR_{expr}$. exp( ) may represent an exponential function with a natural constant e as a base.

The score calculation method in the parameter updating module may be different from the calculation method of fusion ordering, and performs a calculation by an evaluation function set directly by empirical combination and the like, and the score is used as the evaluation score of the final ordering on the plurality of targets. On this basis, the parameters of the fusion ordering model are updated by iteration through evolutionary algorithms such as ES (Evolution Strategy), CMA-ES (Covariance Matrix Adaptation Evolution Strategy) and the like, to finally enable the fusion ordering model to approach to multi-target optimization. Global maximization of income and recommendation clicks is achieved in this scenario.

The search ordering method provided by the embodiment of the present disclosure may realize an ordering method for search suggestions and search recommendations in the search engine, may balance related requirements of a user and the cashability, may provide the better product experience for the user in the search engine and improve the monetization efficiency, and may guide and amplify the recommended result with high value in results meeting the requirements of the user. Compared with the current mainstream search engine, the search ordering method has the advantages that the income is effectively raised while the overall user experience is guaranteed and the requirements of the user are met.

Figure 5:
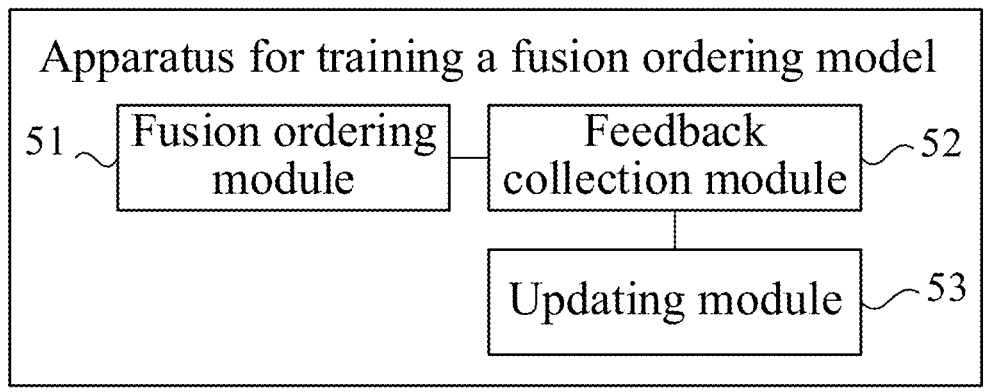
FIG. 5 is a block diagram of an apparatus for training a fusion ordering model according to an embodiment of the present disclosure.

FIG. 5 is a block diagram of an apparatus for training a fusion ordering model according to an embodiment of the present disclosure. The apparatus may include:

a fusion ordering module 51 configured for inputting prediction scores of a plurality of targets included in a candidate search result into an initial fusion ordering model, to obtain a fusion ordering result;

a feedback collection module 52 configured for collecting feedback information of the plurality of targets included in the fusion ordering result; and an updating module 53 configured for updating the initial fusion ordering model by utilizing the feedback information and a combined function, to obtain an updated fusion ordering model, wherein the combined function is a function constructed by utilizing the plurality of targets.

Another embodiment of the present disclosure provides an apparatus for training a fusion ordering model, which may include the modules of the embodiment shown in FIG. 5. In one implementation, the prediction scores of the plurality of targets included in the candidate search result are obtained by utilizing prediction models of the plurality of targets.

In one implementation, the plurality of targets include a first class of targets related to traffic and a second class of targets related to income.

In one implementation, the first class of targets include: at least one of click traffic and click rate, and the second class of targets include: at least one of cost per mille CPM and total income.

In one implementation, the fusion ordering model includes at least one of:

a linear model used for carrying out a linear addition on the prediction scores of the first class of targets and the second class of targets, and calculating a fusion ordering score;

a deep model used for discretizing or expanding the prediction scores of the first class of targets and the second class of targets, and calculating a fusion ordering score through a multilayer neural network; and a fitting model used for combining the prediction scores of the first class of targets and the second class of targets in an exponent and/or logarithmic form, to calculate a fusion ordering score.

In one implementation, the combined function includes at least one of:

a traffic and income exchange ratio function, wherein the traffic and income exchange ratio function is constructed based on a traffic loss ratio and an income raising ratio;

an exponent fusion function, wherein the exponent fusion function is constructed based on the traffic loss ratio and the income raising ratio; and a unilateral suppression fusion function, wherein the unilateral suppression fusion function is constructed based on a traffic gain and an income gain.

The functions of each unit or module in the apparatus for training a fusion ordering model in the embodiments of the present disclosure may refer to corresponding descriptions in the method for training a fusion ordering model described above, and will not be described in detail herein.

Figure 6:
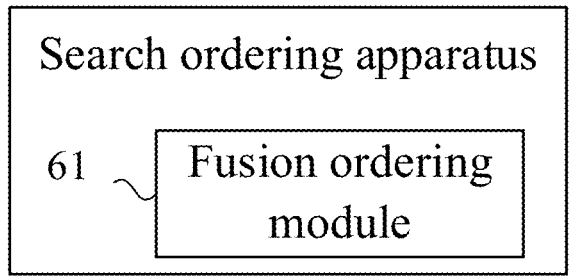
FIG. 6 is a block diagram of a search ordering apparatus according to an embodiment of the present disclosure.

FIG. 6 is a block diagram of a search ordering apparatus according to another embodiment of the present disclosure. The search ordering apparatus may include:

a fusion ordering module 61 configured for inputting prediction scores of a plurality of targets included in a candidate search result into an updated fusion ordering model, to obtain an updated fusion ordering result;

wherein the updated fusion ordering model is trained using the method for training a fusion ordering model in any one of the embodiments of the present disclosure.

Figure 7:
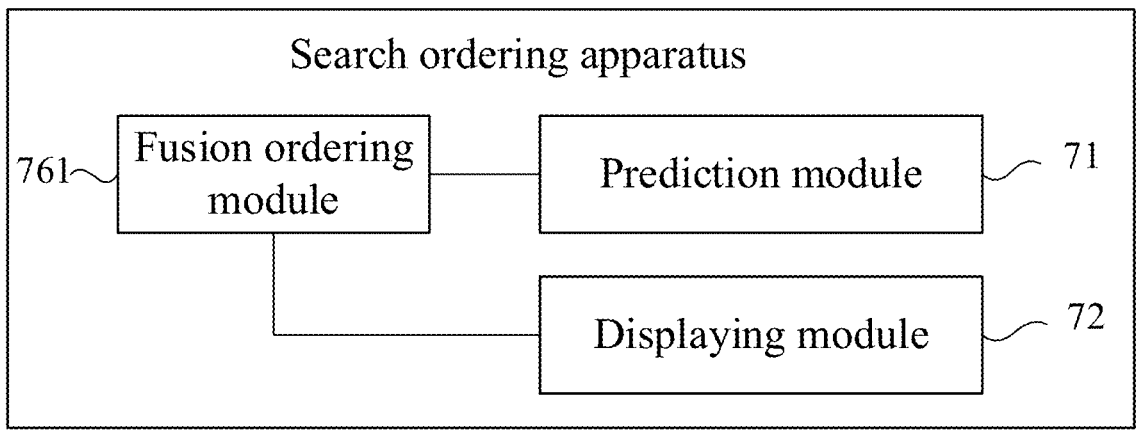
FIG. 7 is a block diagram of a search ordering apparatus according to another embodiment of the present disclosure.

FIG. 7 is a block diagram of a search ordering apparatus according to another embodiment of the present disclosure. The search ordering apparatus of this embodiment may include components of the apparatus embodiments described above. A fusion ordering module 761 shown in FIG. 7 is a module same as or similar to the fusion ordering module 61 shown in FIG. 6. In this embodiment, in one possible implementation, the apparatus further includes:

a prediction module 71 configured for acquiring prediction scores of the plurality of targets included in the candidate search result by utilizing prediction models of the plurality of targets.

In one implementation, the apparatus further includes:

a displaying module 72 configured for displaying a search suggestion and/or a search recommendation including the fusion ordering result, in a search engine.

The functions of each unit or module in the search ordering apparatus in the embodiments of the present disclosure may refer to corresponding descriptions in the above-mentioned search ordering method, and will not be described in detail herein.

According to embodiments of the present disclosure, the present disclosure also provides an electronic device, a readable storage medium and a computer program product.

Figure 8:
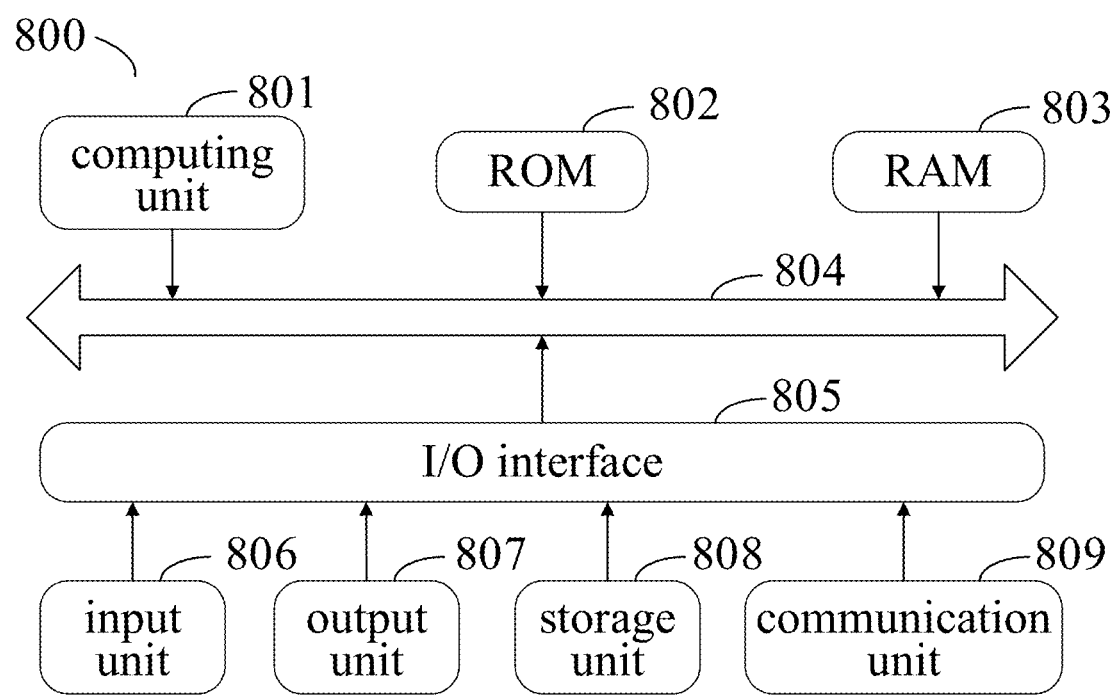
FIG. 8 is a block diagram of an example electronic device configured to implement the embodiments of the present disclosure.

FIG. 8 shows a schematic block diagram of an example electronic device 800 that may be used to implement embodiments of the present disclosure. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as a personal digital assistant, a cellular telephone, a smart phone, a wearable device, and other similar computing devices. The components shown herein, their connections and relationships, and their functions are by way of example only and are not intended to limit the implementations of the present disclosure described and/or claimed herein.

As shown in FIG. 8, the electronic device 800 includes a computing unit 801 that may perform various suitable actions and processes in accordance with computer programs stored in a read only memory (ROM) 802 or computer programs loaded from a storage unit 808 into a random access memory (RAM) 803. In the RAM 803, various programs and data required for the operation of the electronic device 800 may also be stored. The computing unit 801, the ROM 802 and the RAM 803 are connected to each other through a bus 804. An input/output (I/O) interface 805 is also connected to the bus 804.

A plurality of components in the electronic device 800 are connected to the I/O interface 805, including: an input unit 806, such as a keyboard, a mouse, etc.; an output unit 807, such as various types of displays, speakers, etc.; a storage unit 808, such as a magnetic disk, an optical disk, etc.; and a communication unit 809, such as a network card, a modem, a wireless communication transceiver, etc. The communication unit 809 allows the electronic device 800 to exchange information/data with other devices over a computer network, such as the Internet, and/or various telecommunications networks.

The computing unit 801 may be various general purpose and/or special purpose processing assemblies having processing and computing capabilities. Some examples of the computing unit 801 include, but are not limited to, a central processing unit (CPU), a graphics processing unit (GPU), various specialized artificial intelligence (AI) computing chips, various computing units running machine learning model algorithms, a digital signal processor (DSP), and any suitable processor, controller, microcontroller, etc. The computing unit 801 performs various methods and processes described above, such as the method for training a fusion ordering model or the search ordering method. For example, in some embodiments, the method for training a fusion ordering model or the search ordering method may be implemented as computer software programs that are physically contained in a machine-readable medium, such as the storage unit 808. In some embodiments, some or all of the computer programs may be loaded into and/or installed on the electronic device 800 via the ROM 802 and/or the communication unit 809. In a case where the computer programs are loaded into the RAM 803 and executed by the computing unit 801, one or more of steps of the method for training a fusion ordering model or the search ordering method may be performed. Alternatively, in other embodiments, the computing unit 801 may be configured to perform the method for training a fusion ordering model or the search ordering method in any other suitable manner (e.g., by means of a firmware).

Various embodiments of the systems and techniques described herein above may be implemented in a digital electronic circuit system, an integrated circuit system, a field programmable gate array (FPGA), an application specific integrated circuit (ASIC), an application specific standard product (ASSP), a system on a chip (SOC), a load programmable logic device (CPLD), a computer hardware, a firmware, a software, and/or a combination thereof. These various implementations may include an implementation in one or more computer programs, which can be executed and/or interpreted on a programmable system including at least one programmable processor; the programmable processor may be a dedicated or general-purpose programmable processor and capable of receiving and transmitting data and instructions from and to a storage system, at least one input device, and at least one output device.

The program codes for implementing the methods of the present disclosure may be written in any combination of one or more programming languages. These program codes may be provided to a processor or controller of a general purpose computer, a special purpose computer, or other programmable data processing apparatus such that the program codes, when executed by the processor or controller, enable the functions/operations specified in the flowchart and/or the block diagram to be performed. The program codes may be executed entirely on a machine, partly on a machine, partly on a machine as a stand-alone software package and partly on a remote machine, or entirely on a remote machine or server.

In the context of the present disclosure, the machine-readable medium may be a tangible medium that may contain or store programs for using by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination thereof. More specific examples of the machine-readable storage medium may include one or more wire-based electrical connection, a portable computer diskette, a hard disk, a random access memory (RAM), a read-only memory (ROM), an erasable programmable read-only memory (EPROM or Flash memory), an optical fiber, a portable compact disk read-only memory (CD-ROM), an optical storage device, a magnetic storage device, or any suitable combination thereof.

In order to provide an interaction with a user, the system and technology described here may be implemented on a computer having: a display device (e. g., a cathode ray tube (CRT) or a liquid crystal display (LCD) monitor) for displaying information to the user; and a keyboard and a pointing device (e. g., a mouse or a trackball), through which the user can provide an input to the computer. Other kinds of devices can also provide an interaction with the user. For example, a feedback provided to the user may be any form of sensory feedback (e.g., visual feedback, auditory feedback, or tactile feedback); and an input from the user may be received in any form, including an acoustic input, a voice input or a tactile input.

The systems and techniques described herein may be implemented in a computing system (e.g., as a data server) that may include a background component, or a computing system (e.g., an application server) that may include a middleware component, or a computing system (e.g., a user computer having a graphical user interface or a web browser through which a user may interact with embodiments of the systems and techniques described herein) that may include a front-end component, or a computing system that may include any combination of such background components, middleware components, or front-end components. The components of the system may be connected to each other through a digital data communication in any form or medium (e.g., a communication network). Examples of the communication network may include a local area network (LAN), a wide area network (WAN), and the Internet.

The computer system may include a client and a server. The client and the server are typically remote from each other and typically interact via the communication network. The relationship of the client and the server is generated by computer programs running on respective computers and having a client-server relationship with each other.

It should be understood that the steps can be reordered, added or deleted using the various flows illustrated above. For example, the steps described in the present disclosure may be performed concurrently, sequentially or in a different order, so long as the desired results of the technical solutions disclosed in the present disclosure can be achieved, and there is no limitation herein.

The above-described specific embodiments do not limit the scope of the present disclosure. It will be apparent to those skilled in the art that various modifications, combinations, sub-combinations and substitutions are possible, depending on design requirements and other factors. Any modifications, equivalent substitutions, and improvements within the spirit and principles of the present disclosure are intended to be included within the scope of the present disclosure.

What is claimed is:

1. A method for training a fusion ordering model, comprising:

inputting prediction scores of a plurality of targets comprised in a candidate search result into an initial fusion ordering model, to obtain a fusion ordering result;

collecting feedback information of the plurality of targets comprised in the fusion ordering result; and updating the initial fusion ordering model by utilizing the feedback information and a combined function, to obtain an updated fusion ordering model, wherein the combined function is a function constructed by utilizing the plurality of targets, wherein the fusion ordering model comprises at least one of:

a linear model used for carrying out a linear addition on the prediction scores of the first class of targets and the second class of targets, and calculating a fusion ordering score;

a deep model used for discretizing or expanding the prediction scores of the first class of targets and the second class of targets, and calculating a fusion ordering score through a multilayer neural network; and a fitting model used for combining the prediction scores of the first class of targets and the second class of targets in an exponent and/or logarithmic form, to calculate a fusion ordering score.

2. The method of claim 1, wherein the prediction scores of the plurality of targets comprised in the candidate search result are obtained by utilizing prediction models of the plurality of targets.

3. The method of claim 1, wherein the plurality of targets comprise a first class of targets related to traffic and a second class of targets related to income.

4. The method of claim 3, wherein the first class of targets comprise: at least one of click traffic and click rate, and the second class of targets comprise: at least one of cost per mille (CPM) and total income.

5. The method of claim 1, wherein the combined function comprises at least one of:

a traffic and income exchange ratio function, wherein the traffic and income exchange ratio function is constructed based on a traffic loss ratio and an income raising ratio;

an exponent fusion function, wherein the exponent fusion function is constructed based on the traffic loss ratio and the income raising ratio; and a unilateral suppression fusion function, wherein the unilateral suppression fusion function is constructed based on a traffic gain and an income gain.

6. An electronic device, comprising:
at least one processor; and
a memory communicatively connected with the at least one processor,
wherein the memory stores instructions executable by the at least one processor, the instructions being executed by the at least one processor to enable the at least one processor to execute an operation of:
inputting prediction scores of a plurality of targets comprised in a candidate search result into an updated fusion ordering model, to obtain an updated fusion ordering result;
wherein the updated fusion ordering model is trained using the method of claim 1.

7. The electronic device of claim 6, wherein the instructions are executable by the at least one processor to enable the at least one processor to further execute an operation of:
acquiring prediction scores of the plurality of targets comprised in the candidate search result by utilizing prediction models of the plurality of targets.

8. The electronic device of claim 6, wherein the instructions are executable by the at least one processor to enable the at least one processor to further execute an operation of:
displaying a search suggestion and/or a search recommendation comprising the fusion ordering result, in a search engine.

9. A non-transitory computer-readable storage medium storing computer instructions for enabling a computer to execute the method according to claim 1.

10. A search ordering method, comprising:
inputting prediction scores of a plurality of targets comprised in a candidate search result into an updated fusion ordering model, to obtain an updated fusion ordering result;
wherein the updated fusion ordering model is trained using operations of:
inputting prediction scores of a plurality of targets comprised in a candidate search result into an initial fusion ordering model, to obtain a fusion ordering result;
collecting feedback information of the plurality of targets comprised in the fusion ordering result; and
updating the initial fusion ordering model by utilizing the feedback information and a combined function, to obtain the updated fusion ordering model, wherein the combined function is a function constructed by utilizing the plurality of targets,
wherein the fusion ordering model comprises at least one of:
a linear model used for carrying out a linear addition on the prediction scores of the first class of targets and the second class of targets, and calculating a fusion ordering score;
a deep model used for discretizing or expanding the prediction scores of the first class of targets and the second class of targets, and calculating a fusion ordering score through a multilayer neural network; and
a fitting model used for combining the prediction scores of the first class of targets and the second class of targets in an exponent and/or logarithmic form, to calculate a fusion ordering score.

11. The method of claim 10, further comprising:
acquiring prediction scores of the plurality of targets comprised in the candidate search result by utilizing prediction models of the plurality of targets.

12. The method of claim 10, further comprising:
displaying a search suggestion and/or a search recommendation comprising the fusion ordering result, in a search engine.

13. A non-transitory computer-readable storage medium storing computer instructions for enabling a computer to execute the method according to claim 10.

14. An electronic device, comprising:
at least one processor; and
a memory communicatively connected with the at least one processor,
wherein the memory stores instructions executable by the at least one processor, the instructions being executed by the at least one processor to enable the at least one processor to execute operations of:
inputting prediction scores of a plurality of targets comprised in a candidate search result into an initial fusion ordering model, to obtain a fusion ordering result;
collecting feedback information of the plurality of targets comprised in the fusion ordering result; and
updating the initial fusion ordering model by utilizing the feedback information and a combined function, to obtain an updated fusion ordering model, wherein the combined function is a function constructed by utilizing the plurality of targets, wherein the fusion ordering model comprises at least one of:

a linear model used for carrying out a linear addition on the prediction scores of the first class of targets and the second class of targets, and calculating a fusion ordering score;

a deep model used for discretizing or expanding the prediction scores of the first class of targets and the second class of targets, and calculating a fusion ordering score through a multilayer neural network; and a fitting model used for combining the prediction scores of the first class of targets and the second class of targets in an exponent and/or logarithmic form, to calculate a fusion ordering score.

15. The electronic device of claim 14, wherein the prediction scores of the plurality of targets comprised in the candidate search result are obtained by utilizing prediction models of the plurality of targets.

16. The electronic device of claim 14, wherein the plurality of targets comprise a first class of targets related to traffic and a second class of targets related to income.

17. The electronic device of claim 16, wherein the first class of targets comprise: at least one of click traffic and click rate, and the second class of targets comprise: at least one of cost per mille (CPM) and total income.

18. The electronic device of claim 14, wherein the combined function comprises at least one of:

a traffic and income exchange ratio function, wherein the traffic and income exchange ratio function is constructed based on a traffic loss ratio and an income raising ratio;

an exponent fusion function, wherein the exponent fusion function is constructed based on the traffic loss ratio and the income raising ratio; and a unilateral suppression fusion function, wherein the unilateral suppression fusion function is constructed based on a traffic gain and an income gain.

* * * * *